(12) United States Patent
Satish et al.

(10) Patent No.: US 9,684,705 B1
(45) Date of Patent: Jun. 20, 2017

(54) SYSTEMS AND METHODS FOR CLUSTERING DATA

(71) Applicant: Symantec Corporation, Mountain View, CA (US)

(72) Inventors: Sourabh Satish, Fremont, CA (US); Govind Salinas, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 173 days.

(21) Appl. No.: 14/214,581

(22) Filed: Mar. 14, 2014

(51) Int. Cl.
*G06F 17/30* (2006.01)
*G06F 21/56* (2013.01)

(52) U.S. Cl.
CPC .. *G06F 17/30598* (2013.01); *G06F 17/30705* (2013.01); *G06F 17/30713* (2013.01); *G06F 21/56* (2013.01)

(58) Field of Classification Search
USPC .......................................................... 707/737
See application file for complete search history.

(56) References Cited

U.S. PATENT DOCUMENTS

| | | | | |
|---|---|---|---|---|
| 5,796,924 A * | 8/1998 | Errico | .................. | G06K 9/6287 706/15 |
| 6,012,058 A * | 1/2000 | Fayyad | ............. | G06F 17/30705 |
| 6,092,072 A * | 7/2000 | Guha | ................ | G06F 17/30598 707/700 |
| 7,634,661 B2 | 12/2009 | England et al. | | |
| 8,527,978 B1 | 9/2013 | Sallam | | |
| 8,561,193 B1 | 10/2013 | Srivastava et al. | | |
| 8,627,469 B1 | 1/2014 | Chen et al. | | |
| 8,655,883 B1 | 2/2014 | Yuksel | | |
| 2002/0099702 A1* | 7/2002 | Oddo | ................ | G06F 17/30705 707/999.006 |
| 2004/0249774 A1* | 12/2004 | Caid | ................. | G06F 17/30256 706/14 |
| 2007/0185901 A1* | 8/2007 | Gates | .................. | G06F 17/3071 |
| 2010/0077481 A1 | 3/2010 | Polyakov et al. | | |

(Continued)

OTHER PUBLICATIONS

Sourabh Satish; Systems and Methods for Clustering Data Samples; U.S. Appl. No. 13/780,765, filed Feb. 28, 2013.

(Continued)

*Primary Examiner* — Pierre Vital
*Assistant Examiner* — Alicia Antoine
(74) *Attorney, Agent, or Firm* — FisherBroyles LLP

(57) ABSTRACT

A computer-implemented method for clustering data may include (1) identifying a plurality of samples, (2) locating a sample, from within the plurality of samples, that is a centroid of a cluster, (3) locating another sample that is, among the plurality of samples, next closest to the centroid relative to a most-recently located sample, (4) determining whether an attribute of the next-closest sample matches an attribute of the centroid, (5) determining whether to adjust a radius of the cluster based on whether the attribute of the next-closest sample matches the attribute of the centroid, and (6) repeating the steps of locating the next-closest sample, determining whether the attributes match, and determining whether to adjust the radius of the cluster, until the attribute of the next-closest sample does not match the attribute of the centroid. Various other methods, systems, and computer-readable media are also disclosed.

16 Claims, 6 Drawing Sheets

(56) References Cited

U.S. PATENT DOCUMENTS

| | | | |
|---|---|---|---|
| 2010/0083376 | A1 | 4/2010 | Pereira et al. |
| 2011/0107424 | A1 | 5/2011 | Singh et al. |
| 2011/0271341 | A1 | 11/2011 | Satish et al. |
| 2012/0054184 | A1 | 3/2012 | Masud et al. |
| 2013/0276114 | A1 | 10/2013 | Friedrichs et al. |
| 2014/0059048 | A1* | 2/2014 | Knight .............. G06F 17/30713 707/737 |
| 2014/0201208 | A1* | 7/2014 | Satish .................. G06F 21/564 707/737 |
| 2014/0207518 | A1 | 7/2014 | Kannan et al. |

OTHER PUBLICATIONS

Wikipedia, "Cluster Analysis", http://en.wikipedia.org/wiki/Data_clustering#Comparison_between_data_clusterings, as accessed on Nov. 29, 2012.

Khorshidpour, Zeinab et al., "An Evolvable-Clustering-Based Algorithm to Learn Distance Function for Supervised Environment", IJCSI International Journal of Computer Science Issues, vol. 7, Issue 5, (Sep. 2010), 374-381.

Satish, Sourabh, "Behavioral Security: 10 steps forward 5 steps backward", DeepSec IDSC 2011, Vienna, Austria, (Nov. 15-18, 2011).

You, Chao et al., "An Approach to Detect Malicious Behaviors by Evading Stalling Code", TELKOMNIKA, vol. 10, No. 7, (Nov. 2012), pp. 1766-1770.

Sourabh Satish; Systems and Methods for Predicting Optimum Run Times for Software Samples; U.S. Appl. No. 13/794,720, filed Mar. 11, 2013.

Barbará, Daniel, "Requirements for Clustering Data Streams", http://www.cs.iastate.edu/~honavar/datastreamcluster.pdf, as accessed Jan. 14, 2014, SIGKDD Explorations, vol. 3, Issue 2, (Jan. 2002), pp. 23-27.

Nguyen, Hai-Long et al., "Concurrent Semi-supervised Learning of Data Streams", http://link.springer.com/chapter/10.1007%2F978-3-642-23544-3_34, as accessed Jan. 14, 2014, Data Warehousing and Knowledge Discovery, 13th International Conference, DaWaK 2011, Lecture Notes in Computer Science vol. 6862, Springer Berlin Heidelberg, Toulouse, France, (Aug. 29-Sep. 2, 2011), pp. 445-459.

Valko, Michal et al., "Online Semi-Supervised Learning on Quantized Graphs", http://arxiv.org/ftp/arxiv/papers/1203/1203.3522.pdf, as accessed Jan. 14, 2014, Proceedings of the Twenty-Sixth Conference on Uncertainty in Artificial Intelligence (UAI2010), AUAI Press, Catalina Island, CA, (Jul. 8-11, 2010).

Goldberg, Andrew B., "OASIS: Online Active Semi-Supervised Learning", http://pages.cs.wisc.edu/~jerryzhu/pub/oasis.pdf, as accessed Jan. 14, 2014, Association for the Advancement of Artificial Intelligence, (2011).

Kholghi, Mahnoosh et al., "Active Learning Framework Combining Semi-Supervised Approach for Data Stream Mining", http://link.springer.com/chapter/10.1007%2F978-3-642-18134-4_38, as accessed Jan. 14, 2014, Intelligent Computing and Information Science, International Conference, ICICIS 2011, Proceedings, Part II, Communications in Computer and Information Science vol. 135, Springer Berlin Heidelberg, Chongqing, China, (Jan. 8-9, 2011), pp. 238-243.

Hu, Xin et al., "MutantX-S: Scalable Malware Clustering Based on Static Features", http://0b4af6cdc2f0c5998459-c0245c5c937c5dedcca3f1764ecc9b2f.r43.cf2.rackcdn.com/11753-atc13-hu.pdf, as accessed Jan. 14, 2014, 2013 USENIX Annual Technical Conference (USENIX ATC '13), USENIX Association, (2013), pp. 187-198.

Joseph H. Chen; Systems and Methods for Preventing Positive Malware Identification; U.S. Appl. No. 14/197,877, filed Mar. 5, 2014.

Sourabh Satish; Systems and Methods for Updating Generic File-Classification Definitions; U.S. Appl. No. 14/210,364, filed Mar. 13, 2014.

Gonzalez, Teofilo F., "Clustering to Minimize the Maximum Intercluster Distance", https://www.cs.ucsb.edu/~teo/papers/Ktmm.pdf, as accessed Jan. 14, 2014, Theoretical Computer Science 38, North-Holland, Elsevier Science Publishers B.V., (1985), pp. 293-306.

Sourabh Satish; Systems and Methods for Predicting Optimum Run Times for Software Samples; U.S. Appl. No. 15/192,646, filed Jun. 24, 2016.

\* cited by examiner

SYSTEMS AND METHODS FOR CLUSTERING DATA

BACKGROUND

Enterprises, researchers, and various other entities increasingly deal with the challenge of organizing large sets of data in meaningful ways. Clustering is one technique that is frequently used to organize data by finding intrinsic grouping among data samples. Creating clusters typically involves evaluating a set of data samples and grouping samples that are related to each other.

Clusters may be formed using a variety of algorithms and techniques, such as the furthest-point-first algorithm, which is a fast variant of the k-means algorithm. Many traditional clustering solutions may use the furthest-point-first algorithm as a stepping stone to other types of more effective clustering algorithms (e.g., hierarchical clustering algorithms). While these traditional approaches may eventually produce useful clusters, they may be time and resource intensive. Furthermore, traditional clustering approaches mail fail to yield optimized cluster groupings and/or sizes. Accordingly, the instant disclosure identifies and addresses a need for additional and improved systems and methods for clustering data.

SUMMARY

As will be described in greater detail below, the instant disclosure describes various systems and methods for clustering data by adjusting a cluster radius based a shared property. For example, a computer-implemented method for clustering data may include (1) identifying a plurality of samples, (2) locating a sample, from within the plurality of samples, that is a centroid of a cluster, (3) locating another sample that is, among the plurality of samples, next closest to the centroid relative to a most-recently located sample, (4) determining whether an attribute of the next-closest sample matches an attribute of the centroid, (5) determining whether to adjust a radius of the cluster based on whether the attribute of the next-closest sample matches the attribute of the centroid, and (6) repeating the steps of locating the next-closest sample, determining whether the attributes match, and determining whether to adjust the radius of the cluster until the attribute of the next-closest sample does not match the attribute of the centroid. In some examples, the method may further include determining that the attribute of the next-closest sample does not match the attribute of the centroid and, in response, setting the next-closest sample as a centroid of an additional cluster.

In some embodiments, the attribute of the centroid may include a malware classification and/or a label with which the sample has been tagged that indicates the attribute of the sample. In some examples, determining whether the attribute of the next-closest sample matches the attribute of the centroid may include identifying and comparing the attribute of the next-closest sample and the attribute of the centroid.

In some examples, determining whether the attribute of the next-closest sample matches the attribute of the centroid may include determining that the attributes match. In these examples, determining whether to adjust the radius of the cluster may include determining to not adjust the existing radius.

In other examples, determining whether the attribute of the next-closest sample matches the attribute of the centroid may include determining that the attributes do not match. In these examples, determining whether to adjust the radius of the cluster may include determining to adjust the existing radius by setting the radius as a distance from the centroid to a most-recently located matching sample such that only samples with matching attributes are included within the cluster. In some cases, the most-recently located matching sample may be located within the existing radius. In these cases, adjusting the existing radius may include decreasing the existing radius. In other cases, the most-recently located matching sample may be located outside the existing radius. In these cases, adjusting the existing radius may include increasing the existing radius.

In one embodiment, a system for implementing the above-described method may include (1) an identification module that identifies a plurality of samples, (2) a location module that (a) locates a sample, from within the plurality of samples, that is a centroid of a cluster and (b) locates another sample that is, among the plurality of samples, next closest to the centroid relative to a most recently located sample, (3) a determination module that (a) determines whether an attribute of the next-closest sample matches an attribute of the centroid and (b) determines whether to adjust a radius of the cluster based on whether the attribute of the next-closest sample matches the attribute of the centroid, (4) a repetition module that repeats the steps of locating the next-closest sample, determining whether the attributes match, and determining whether to adjust the radius of the cluster, until the attribute of the next-closest sample does not match the attribute of the centroid, and (5) at least one processor that executes the identification module, the location module, the determination module, and the repetition module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a plurality of samples, (2) locate a sample, from within the plurality of samples, that is a centroid of a cluster, (3) locate another sample that is, among the plurality of samples, next closest to the centroid relative to a most recently located sample, (4) determine whether an attribute of the next-closest sample matches an attribute of the centroid, (5) determine whether to adjust a radius of the cluster based on whether the attribute of the next-closest sample matches the attribute of the centroid, and (6) repeat the steps of locating the next-closest sample, determining whether the attributes match, and determining whether to adjust the radius of the cluster, until the attribute of the next-closest sample does not match the attribute of the centroid.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
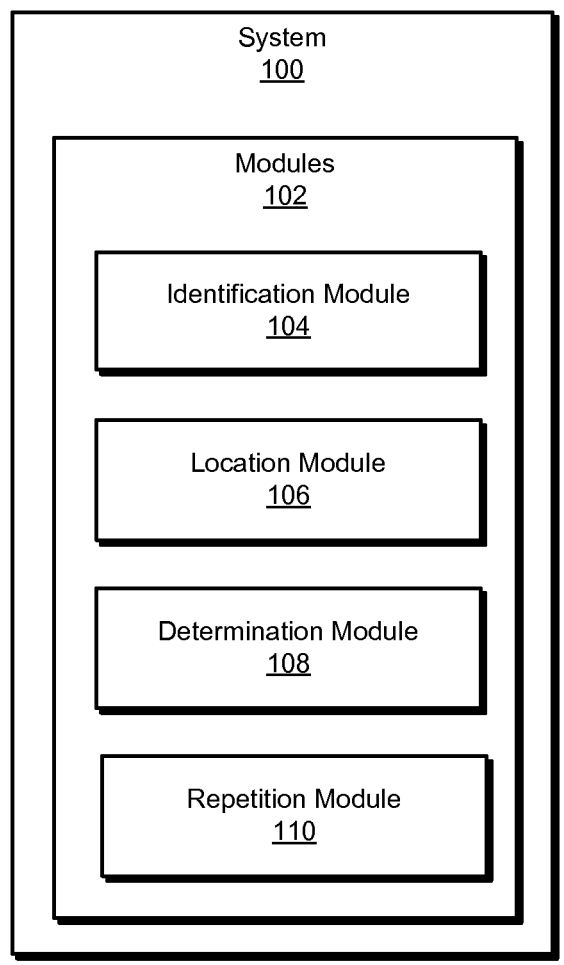
FIG. 1 is a block diagram of an exemplary system for clustering data.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for clustering data. As will be explained in greater detail below, by adjusting the radius of clusters based on attributes of samples within the clusters, the systems and methods described herein may produce clusters of samples that share the same class. In addition, the disclosed systems and methods may optimize cluster groupings with clusters of variable sizes. Furthermore, the disclosed systems and methods may produce such clusters in a single pass without requiring multiple iterations of a clustering algorithm, therefore reducing the time and resources required to form useful clusters. The systems and methods presented in this disclosure may also provide various other features and advantages.

Figure 2:
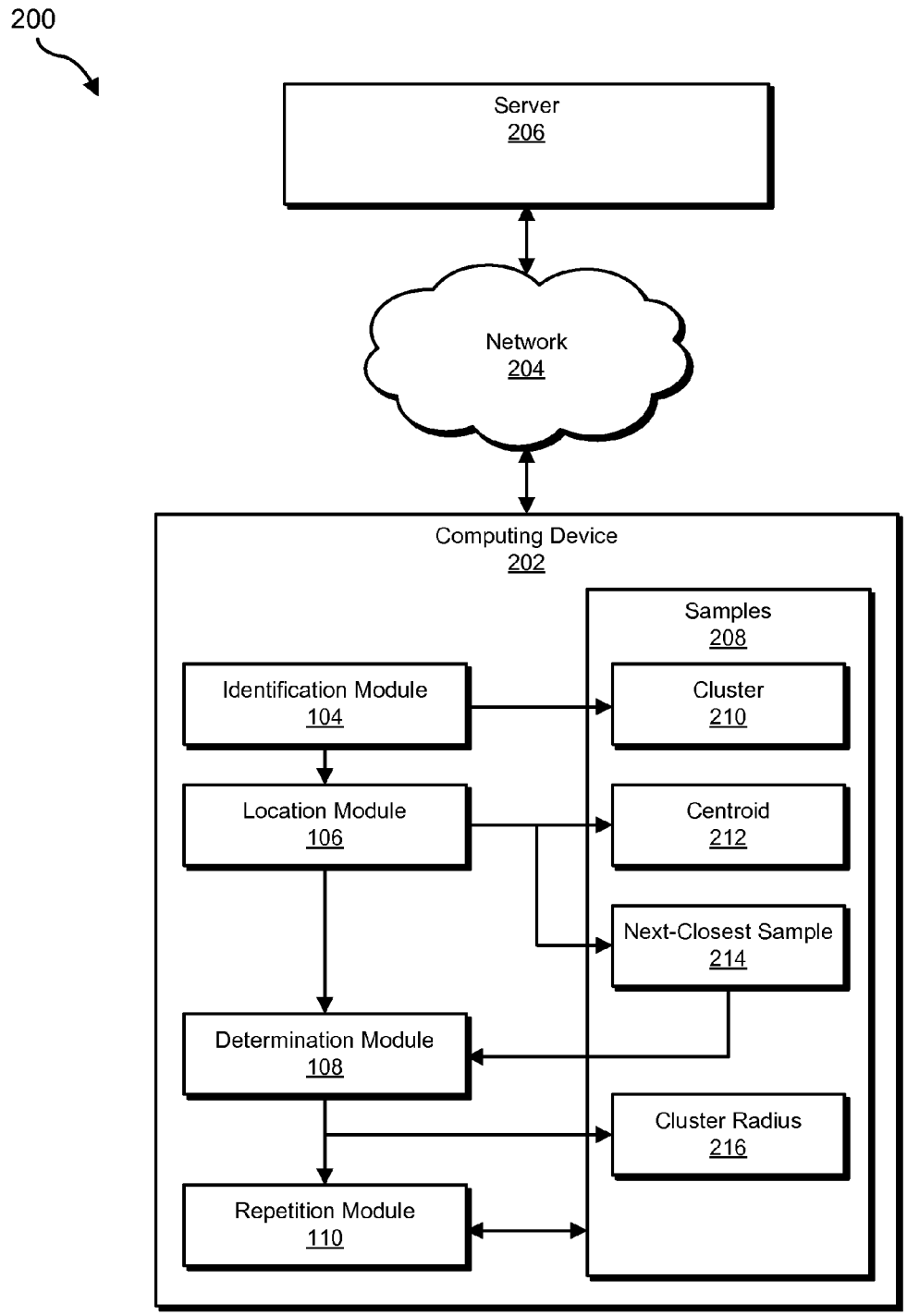
FIG. 2 is a block diagram of an additional exemplary system for clustering data.

The following will provide, with reference to FIGS. 1-2, detailed descriptions of exemplary systems for clustering data. Detailed descriptions of corresponding computer-implemented methods will also be provided in connection with FIGS. 3 and 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for clustering data. As illustrated in this figure, exemplary system 100 may include one or more modules 102 for performing one or more tasks. For example, and as will be explained in greater detail below, exemplary system 100 may include an identification module 104 that identifies a plurality of samples. Exemplary system 100 may also include a location module 106 that (a) locates a sample, from within the plurality of samples, that is a centroid of a cluster and (b) locates another sample that is, among the plurality of samples, next closest to the centroid relative to a most-recently located sample.

In addition, exemplary system 100 may include a determination module 108 that (a) determines whether an attribute of the next-closest sample matches an attribute of the centroid and (b) determines whether to adjust a radius of the cluster based on whether the attribute of the next-closest sample matches the attribute of the centroid. Furthermore, exemplary system 100 may include a repetition module 110 that repeats the steps of locating the next-closest sample, determining whether the attributes match, and determining whether to adjust the radius of the cluster, until the attribute of the next-closest sample does not match the attribute of the centroid. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102. Additionally or alternatively, server 206 may be programmed with one or more of modules 102.

In one embodiment, one or more of modules 102 from FIG. 1 may, when executed by at least one processor of computing device 202 and/or server 206, enable computing device 202 and/or server 206 to cluster data. For example, and as will be described in greater detail below, identification module 104 may cause computing device 202 and/or server 206 to identify a plurality of samples (e.g., samples 208). Next, location module 106 may cause computing device 202 and/or server 206 to locate a sample (e.g., centroid 212), from within the plurality of samples, that is a centroid of a cluster (e.g., cluster 210). Location module 106 may also cause computing device 202 and/or server 206 to locate another sample (e.g., next-closest sample 214) that is, among the plurality of samples, next closest to the centroid relative to a most recently located sample. In addition, determination module 108 may cause computing device 202 and/or server 206 to determine whether an attribute of the next-closest sample matches an attribute of the centroid. Determination module 108 may then cause computing device 202 and/or server 206 to determine whether to adjust a radius (e.g., cluster radius 216) of the cluster based on whether the attribute of the next-closest sample matches the attribute of the centroid. Furthermore, repetition module 110 may cause computing device 202 and/or server 206 to repeat the steps of locating the next-closest sample, determining whether the attributes match, and determining whether to adjust the radius of the cluster, until the attribute of the next-closest sample does not match the attribute of the centroid, Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Server 206 generally represents any type or form of computing device that is capable of storing, analyzing, and grouping data samples and/or attributes of data samples. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and server 206.

Figure 3:
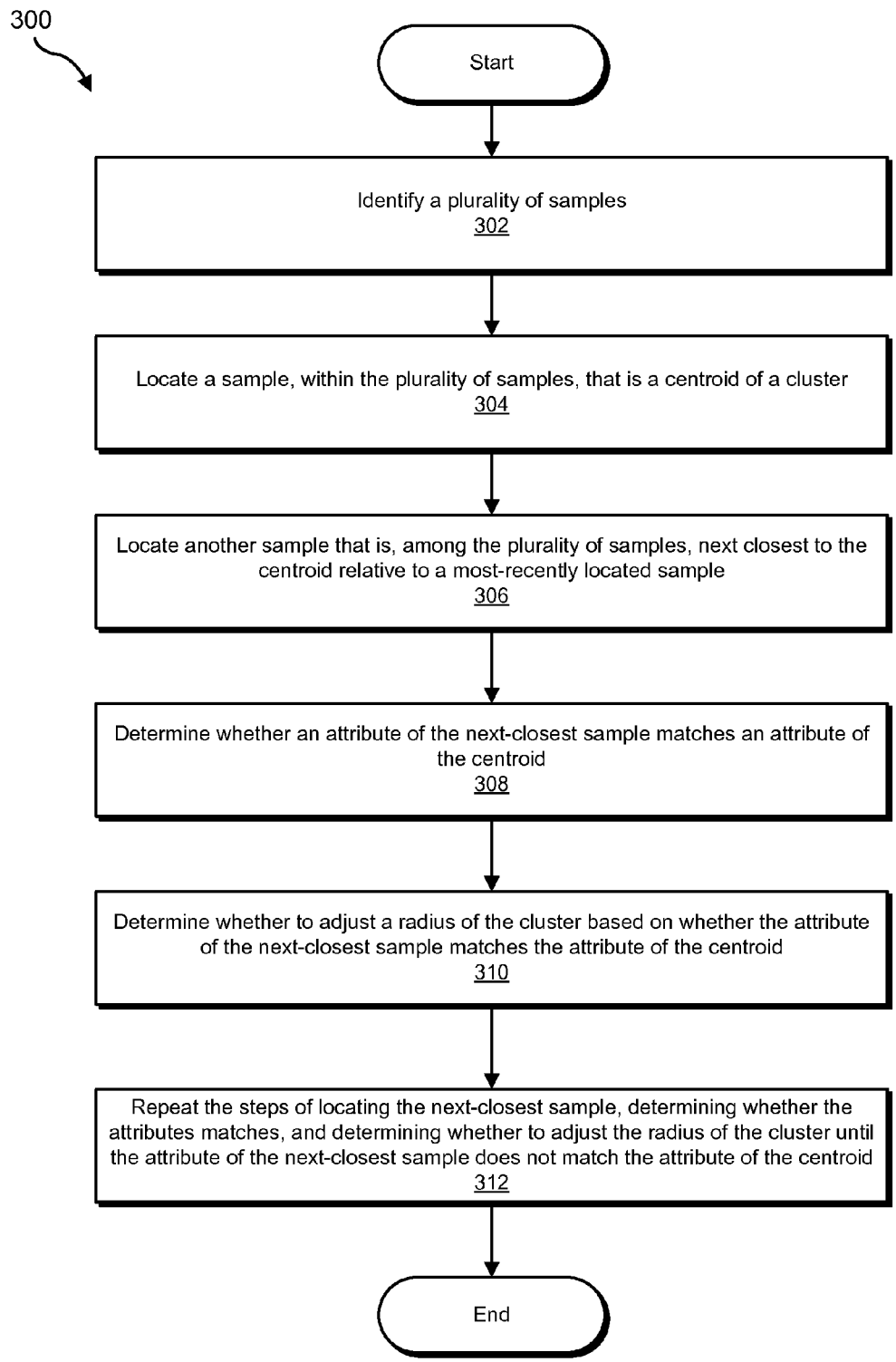
FIG. 3 is a flow diagram of an exemplary method for clustering data.

FIG. 3 is a flow diagram of an exemplary computer-implemented method 300 for clustering data. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a plurality of samples. For example, identification module 104 may, as part of computing device 202 in FIG. 2, identify samples 208.

As used herein, the term "sample" may refer to any data object, document, data record, and/or vector that may be reduced to a set of features and clustered. Examples of samples may include, without limitation, malware samples, web pages, customer records, digital images, social networking profiles, and computing platform profiles.

The systems described herein may identify the plurality of samples in a variety of ways. For example, identification module 104 may identify samples 208 within a database. Additionally or alternatively, identification module 104 may collect samples 208 as part of a data mining operation. In some examples, identification module 104 may receive samples 208 from a plurality of remote agents.

In some embodiments, identification module 104 may identify samples that have previously been clustered by any of a variety of clustering algorithms. Because many clustering algorithms form a predetermined number of clusters and/or clusters of a predetermined size, these algorithms may produce clusters that contain data samples with dissimilar classes. As such, identification module 104 may identify previously-clustered samples in order to more effectively cluster them according to one or more particular attributes. Additionally or alternatively, identification module 104 may identify a set of samples that have not yet been clustered.

Returning to FIG. 3, at step 304 one or more of the systems described herein may locate a sample, from within the plurality of samples, that is a centroid of a cluster. For example, location module 106 may, as part of computing device 202 in FIG. 2, locate centroid 212 within cluster 210. The term "centroid," as used herein, generally refers to any data sample that is the center of a cluster and which other data samples are grouped around.

Figure 4:
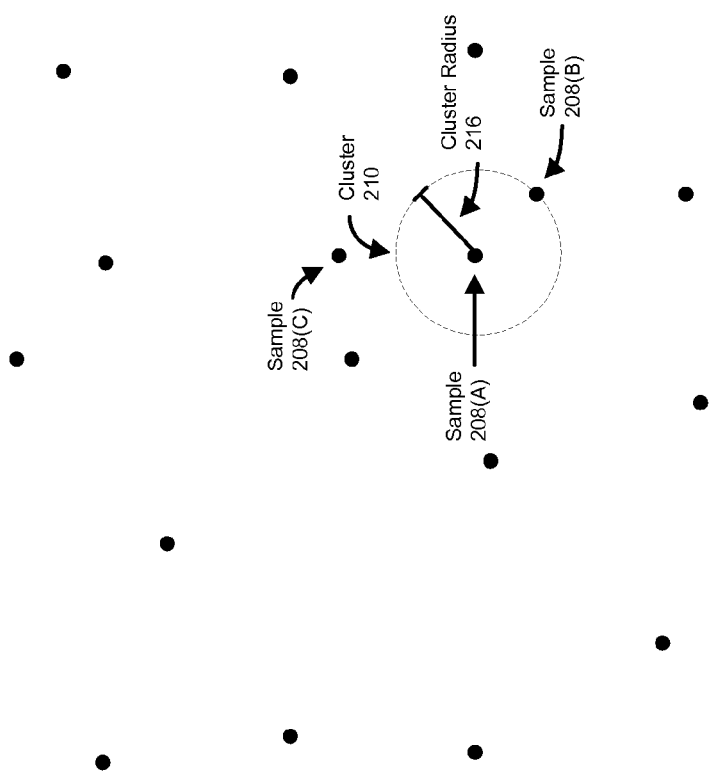
FIG. 4 is an illustration of an exemplary cluster within a plurality of samples.

The systems described herein may locate the centroid in a variety of ways. As mentioned above, samples 208 may have previously been clustered by any of a variety of clustering algorithms. Accordingly, location module 106 may locate an existing centroid from within samples 208. As illustrated in FIG. 4, samples 208 may contain cluster 210, defined by cluster radius 216, that includes sample 208(A) as the centroid. As an example, location module 106 may identify sample 208(A) as centroid 212. Additionally or alternatively, location module 106 may identify a centroid by identifying a sample (randomly or using any suitable algorithm) to function as the centroid.

In some embodiments, location module 106 may randomly select centroid 212 to avoid additional and unnecessary analyses of samples 208. In other embodiments, location module 106 may select centroid 212 based on one or more properties of centroid 212 and/or cluster 210. For example, location module 106 may select centroid 212 based on the location of centroid 212 within samples 208 (e.g., closest or farthest from the center), the size of cluster 210 (e.g., the largest or smallest cluster), an attribute of centroid 212 (e.g., a label or feature describing centroid 212), and/or any other suitable property.

Returning to FIG. 3, at step 306 one or more of the systems described herein may locate another sample that is, among the plurality of samples, next closest to the centroid relative to a most recently located sample. For example, location module 106 may locate next-closest sample 214.

The systems described herein may locate the next-closest sample in a variety of ways. For example, location module 106 may locate next-closest sample 214 using any suitable distance algorithm. As previously mentioned, location module 106 may have identified sample 208(A) in FIG. 4 as centroid 212. Location module 106 may then determine that sample 208(B) is the sample closest to sample 208(A) according to a particular distance algorithm or measurement (e.g., the Euclidean distance) and may therefore identify sample 208(B) as next-closest sample 214. As will be explained in greater detail below, location module 106 may proceed to identify another sample (e.g., sample 208(C)) as the next-closest sample based on an analysis of samples 208(A-B).

The phrase "most-recently located sample," as used herein, generally refers to any sample that was most recently located in a cluster using any algorithm discussed herein. For example, a most-recently located sample may first be a cluster centroid, and then, once the sample closest to the centroid is located, that sample may become the most-recently located sample.

The phrase "next-closest sample," as used herein, generally refers to a sample that is further from a centroid than the most-recently located sample but closer to the centroid that any other samples that are further from the centroid than the most-recently located sample. In other words, a next-closest sample may be a sample with a radius that is longer than the most-recently located sample and shorter than radii of any other samples that have radii that are longer than the most-recently located sample (the centroid may be considered to have a radii of zero).

Returning to FIG. 3, at step 308 one or more of the systems described herein may determine whether an attribute of the next-closest sample matches an attribute of the centroid. For example, determination module 108 may determine whether an attribute of next-closest sample 214 matches an attribute of centroid 212.

The systems described herein may determine whether the attributes of the centroid and the next-closest sample match in a variety of ways. For example, determination module 108 may determine whether the attributes match by identifying and comparing the attributes of next-closest sample 214 and centroid 212. In some embodiments, each data sample within samples 208 may have previously been labelled with an attribute. In other embodiments, one or more data samples within samples 208 may not have been labelled with an attribute and therefore determination module 108 may analyze the sample in order to identify the attribute. Determination module 108 may analyze a sample by analyzing data in the sample, meta-data of the sample, an origin of the sample (e.g., a source from which the sample was collected), a database where the sample is stored, and/or any other characteristic or context of the sample.

As used herein, the term "attribute" generally refers to any type or form of class, feature, characteristic, property, classification, and/or label that describes a data sample. For example, each sample may represent a data point in a study and the attribute may be a category (e.g., gender, color, etc.) that describes a data point. Additionally or alternatively, an attribute may indicate whether a sample is dependent on another sample (e.g., a parent or child data sample). In another example, an attribute may indicate that a sample represents malware and/or indicate a specific type of malware. In some embodiments, a sample may be tagged with a label that indicates the attribute of the sample. While many clustering algorithms group samples based at least in part on features of the samples, determination module 108 may identify and analyze a single attribute of a sample (e.g., a centroid) in order to optimize clusters based on that particular attribute. In other embodiments, determination module 108 may optimize clusters based on two or more attributes of a sample.

Using FIG. 4 as an example, determination module 108 may identify the attribute of sample 208(A) (identified as centroid 212 of cluster 210) by determining that sample 208(A) has been labelled as "category 1." In addition, determination module 108 may determine that sample 208(B) (identified as next-closest sample 214) has also been labelled "category 1." Therefore, determination module 108 may determine that the attribute of next-closest sample 214 matches the attribute of centroid 212. However, if determination module 108 determines that sample 208(A) has been labelled as "category 1" and that sample 208(B) has been labelled as "category 2," determination module 108 may then determine that the attribute of next-closest sample 214 does not match the attribute of centroid 212.

Returning to FIG. 3, at step 310 one or more of the systems described herein may determine whether to adjust a radius of the cluster based on whether the attribute of the next-closest sample matches the attribute of the centroid. For example, determination module 108 may determine whether to adjust cluster radius 216 based on whether the attribute of next-closest sample 214 matches the attribute of centroid 212.

The systems described herein may determine whether to adjust the radius of the cluster based on whether the attributes of the next-closest sample and the centroid match in a variety of ways. In some examples, determination module 108 may determine to not adjust the cluster radius in response to determining that the attribute of the next-closest sample matches the attribute of the centroid. Determination module 108 may also determine to adjust the cluster radius by setting the radius as a distance from the centroid to a most-recently located matching sample in response to determining that the attribute of the next-closest sample does not match the attribute of the centroid.

For example, as illustrated in FIG. 4, cluster radius 216 may originally include sample 208(A) and sample 208(B). If determination module 108 had determined that the attributes of sample 208(A) and sample 208(B) match (e.g., by both samples being labelled as "category 1"), determination module 108 may then determine to not adjust cluster radius 216, as determination module 108 has not yet determined that cluster 210 contains any sample not labelled as "category 1." However, if determination module 108 had determined that the attributes of sample 208(A) and sample 208(B) do not match, determination module 108 may then determine to adjust cluster radius 216 by setting cluster radius 216 as the distance from centroid 212 to a most-recently located matching sample. In this case, sample 208(A) is the only matching sample in cluster 210 and therefore determination module 108 may set cluster radius 216 to only include sample 208(A).

Alternatively, determination module 108 may adjust the cluster radius by setting the radius as a distance from the centroid to the next-closest sample in response to determining that the attribute of the next-closest sample matches the attribute of the centroid, and by determining to not adjust the radius in response to determining that the attributes do not match. In general, determination module 108 may determine to adjust the cluster radius in any way such that the cluster includes samples whose attributes match the attribute of the centroid and excludes samples whose attributes do not match the attribute of centroid. In this way, determination module 108 may re-organize clusters such that they only include samples with matching attributes.

Returning to FIG. 3, at step 312 one or more of the systems described herein may repeat the steps of locating the next-closest sample, determining whether the attributes match, and determining whether to adjust the radius of the cluster until the attribute of the next-closest sample does not match the attribute of the centroid. For example, repetition module 110 may direct location module 106 and determination module 108 to repeat the steps of locating next-closest sample 214, determining whether the attributes match, and determining whether to adjust cluster radius 216 until the attribute of next-closest sample 214 does not match the attribute of centroid 212.

The systems described herein may repeat the steps until the attribute of the next-closest sample does not match the attribute of the centroid in a variety of ways. Continuing with the example of FIG. 4, determination module 108 may have determined that the attributes of sample 208(A) and sample 208(B) match based on both samples being labelled as "category 1" and therefore determination module 108 may have determined to not adjust cluster radius 216. In response to that determination, repetition module 110 may direct location module 106 to locate the sample that is closest to the centroid after sample 208(B). For example, location module 106 may identify sample 208(C) as the next-closest sample.

After identifying sample 208(C) as the next-closest sample, determination module 108 may determine whether an attribute of sample 208(C) matches the attribute of sample 208(A). For example, determination module 108 may determine whether sample 208(C) has been labelled as "category 1." If determination module 108 determines that sample 208(C) has been labelled as "category 1," determination module 108 may determine to not adjust cluster radius 216. However, if determination module 108 determines that sample 208(C) has been tagged with a different label (e.g., category 3), determination module 108 may determine to adjust cluster radius 216 by setting it as the distance from sample 208(A) to sample 208(B).

The systems described herein may adjust the radius of a cluster in any suitable manner such that only samples with matching attributes are included within the cluster. In some examples, the most-recently located matching sample may be located within an existing radius of a cluster. For example, determination module 108 may determine that the first sample whose attribute does not match the attribute of the centroid is located within the existing cluster radius. In these examples, determination module 108 may adjust the existing radius by decreasing the radius. In other examples, determination module 108 may determine that the most-recently located matching is located outside the existing radius, and may therefore adjust the radius by increasing the radius.

Furthermore, the systems described herein may be used to re-organize multiple clusters within a plurality of samples. For example, in response to determination module 108 determining that the attribute of the next-closest sample does not match the attribute of the centroid, location module 106 may set the next-closest sample with the attribute that does not match as a centroid of an additional cluster. Location module 106 and determination module 108 may then repeat the steps of locating a next-closest sample, determining whether the attributes match, and determining whether to adjust the radius of a cluster based around the new centroid until determination module 108 determines that the attribute of the next-closest sample and the attribute of the additional centroid do not match. This process may then be repeated until all of the samples within the plurality of samples have been re-structured to contain only samples with matching attributes.

The systems and methods described herein may be implemented in a variety of ways and provide a number of advantages. For example, by defining cluster boundaries based on properties of samples rather than a predetermined cluster radius, the systems and methods described herein may more effectively group sets of samples. In addition, by restructuring existing clusters, the disclosed systems and methods may improve the quality of the clusters without requiring multiple applications of additional clustering techniques. In other words, the systems and methods described in this disclosure may adjust and/or create clusters efficiently and effectively in a single pass.

Figure 5:
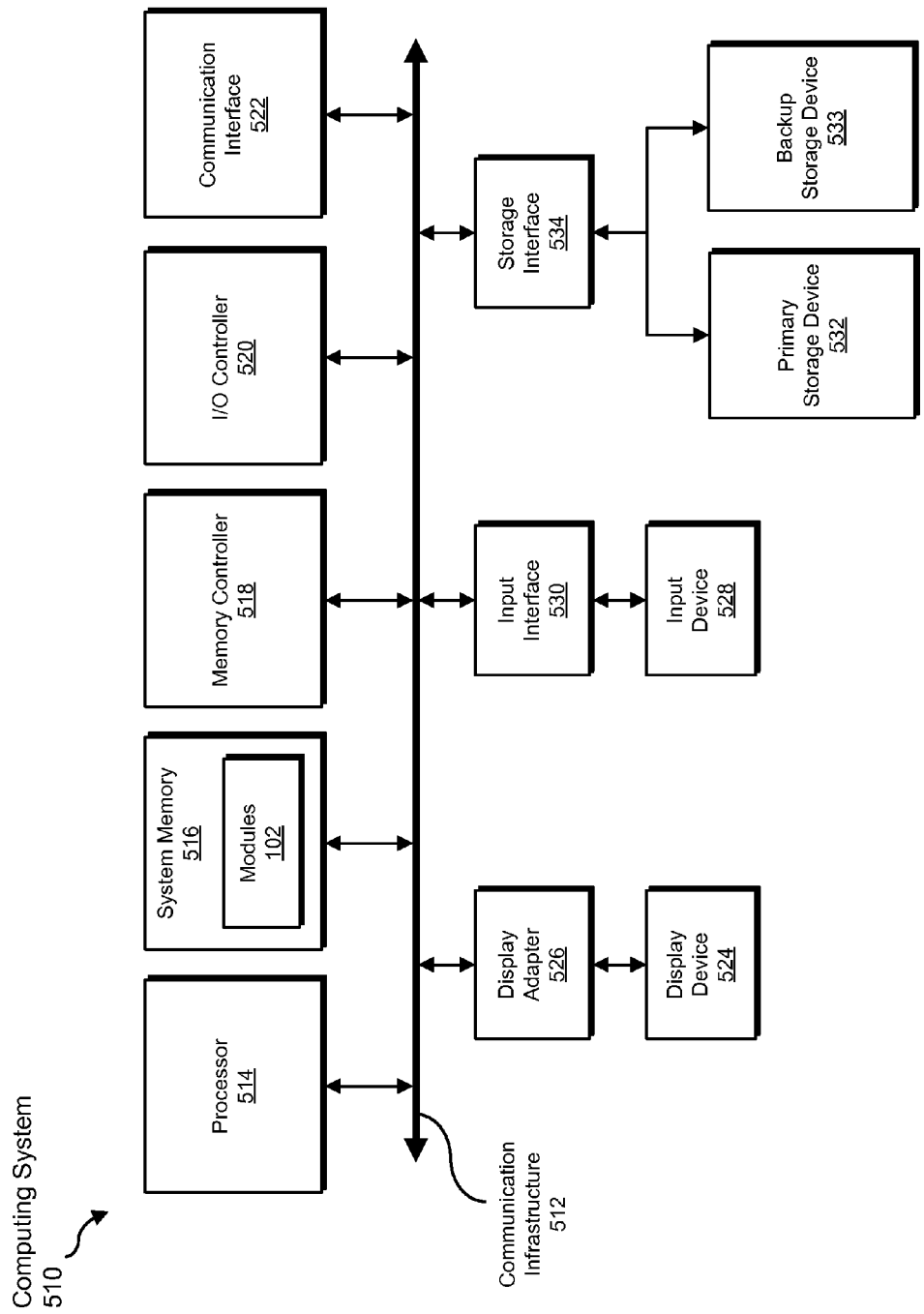
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
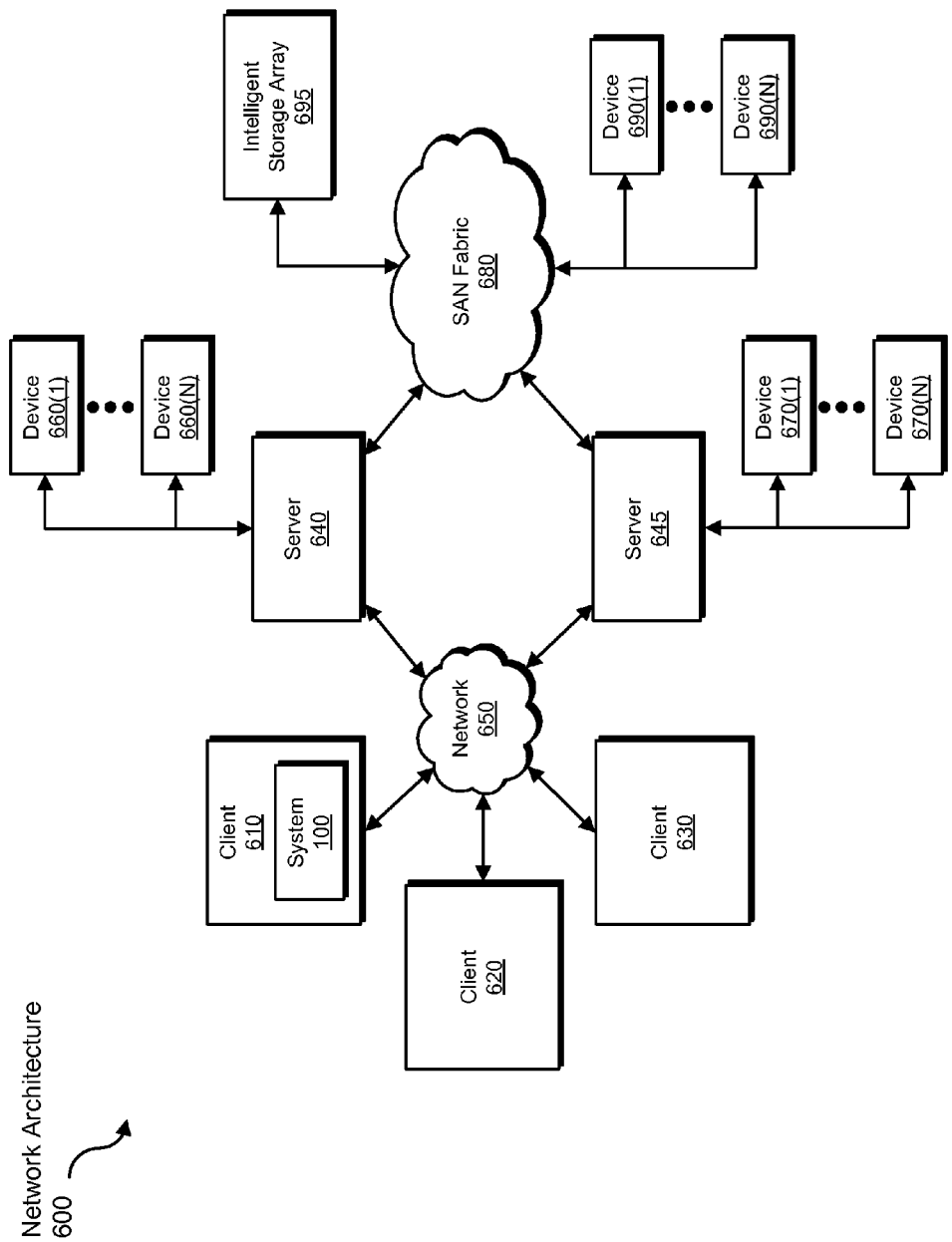
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for clustering data.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a plurality of clustered samples, analyze attributes of the samples, and transform the clusters into re-organized clusters varying cluster radii. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for clustering data, at least a portion of the method being performed by a computing device comprising at least one processor, the method comprising:
    identifying a plurality of samples that have been grouped into existing clusters, the existing clusters comprising a predetermined cluster radius; locating a sample, from within the plurality of samples, that is a centroid of an existing cluster;
    restructuring the existing cluster to generate a new cluster that includes samples with matching attributes by:
        locating another sample that is, among the plurality of samples, next closest to the centroid relative to a most recently located sample;
        determining whether an attribute of the next-closest sample matches an attribute of the centroid;
        determining whether to adjust the radius of the existing cluster based on whether the attribute of the next-closest sample matches the attribute of the centroid;
        repeating the steps of locating the next-closest sample, determining whether the attributes match, and determining whether to adjust the radius of the existing cluster until the attribute of the next-closest sample does not match the attribute of the centroid, and when the attribute of the next-closest sample does not match the attribute of the centroid, adjusting the radius of the existing cluster by setting the radius as a distance from the centroid to a most-recently located matching sample such that only samples with matching attributes are included within the new cluster; and
    restructuring the existing clusters that have not been restructured by generating, using samples within the plurality of samples that are not included in the new cluster, additional new clusters until each sample within the plurality of samples is included within at least one new cluster, wherein for each additional new cluster:

the additional new cluster comprises a variable cluster radius instead of the predetermined cluster radius;

the additional new cluster includes at least one sample whose attribute matches an attribute of a centroid of the additional new cluster; and the additional new clusters are generated by a computing system such that a single pass over the plurality of samples is needed to assign each sample to a new cluster without requiring additional computing resources that would be needed from the computing system for multiple iterations of a clustering algorithm.

2. The method of claim 1, wherein the attribute of the centroid comprises at least one of:

a label with which the sample has been tagged that indicates the attribute of the sample; and a malware classification.

3. The method of claim 1, wherein determining whether the attribute of the next-closest sample matches the attribute of the centroid comprises:

identifying the attribute of the next-closest sample and the attribute of the centroid; and comparing the attribute of the next-closest sample to the attribute of the centroid.

4. The method of claim 1, wherein:

determining whether the attribute of the next-closest sample matches the attribute of the centroid comprises determining that the attribute of the next-closest sample matches the attribute of the centroid; and determining whether to adjust the radius of the existing cluster comprises determining to not adjust the radius.

5. The method of claim 1, wherein:

when the attribute of the next-closest sample does not match the attribute of the centroid, the most-recently located matching sample is located within the radius; and adjusting the radius comprises decreasing the radius.

6. The method of claim 1, wherein:

when the attribute of the next-closest sample does not match the attribute of the centroid, the most-recently located matching sample is located outside the radius; and adjusting the radius comprises increasing the radius.

7. A system for clustering data samples, the system comprising:

an identification module that identifies a plurality of samples that have been grouped into existing clusters, the existing clusters comprising a predetermined cluster radius;

a location module that:

locates a sample, from within the plurality of samples, that is a centroid of an existing cluster;

locates another sample that is, among the plurality of samples, next closest to the centroid relative to a most recently located sample;

a determination module that:

determines whether an attribute of the next-closest sample matches an attribute of the centroid;

determines whether to adjust the radius of the existing cluster based on whether the attribute of the next-closest sample matches the attribute of the centroid;

a repetition module that:

restructures the existing cluster to generate a new cluster that includes samples with matching attributes by repeating the steps of locating the next-closest sample, determining whether the attributes match, and determining whether to adjust the radius of the existing cluster until the attribute of the next-closest sample does not match the attribute of the centroid, and when the attribute of the next-closest sample does not match the attribute of the centroid, adjusts the radius of the existing cluster by setting the radius as a distance from the centroid to a most-recently located matching sample such that only samples with matching attributes are included within the new cluster;

restructures the existing clusters that have not been restructured by generating, using samples within the plurality of samples that are not included in the new cluster, additional new clusters until each sample within the plurality of samples is included within at least one new cluster, wherein for each additional new cluster:

the additional new cluster comprises a variable cluster radius instead of the predetermined cluster radius;

the additional new cluster includes at least one sample whose attribute matches an attribute of a centroid of the additional new cluster; and the additional new clusters are generated by a computing system such that a single pass over the plurality of samples is needed to assign each sample to a new cluster without requiring additional computing resources that would be needed from the computing system for multiple iterations of a clustering algorithm; and at least one processor that executes the identification module, the determination module and the repetition module.

8. The system of claim 7, wherein the attribute of the centroid comprises at least one of:

a label with which the sample has been tagged that indicates the attribute of the sample; and a malware classification.

9. The system of claim 7, wherein the determination module determines whether the attribute of the next-closest sample matches the attribute of the centroid by:

identifying the attribute of the next-closest sample and the attribute of the centroid; and comparing the attribute of the next-closest sample to the attribute of the centroid.

10. The system of claim 7, wherein the determination module:

determines whether the attribute of the next-closest sample matches the attribute of the centroid by determining that the attribute of the next-closest sample matches the attribute of the centroid; and determines whether to adjust the radius of the existing cluster by determining to not adjust the radius.

11. The system of claim 7, wherein:

when the attribute of the next-closest sample does not match the attribute of the centroid, the most-recently located matching sample is located within the radius; and the determination module adjusts the radius by decreasing the radius.

12. The system of claim 7, wherein:

when the attribute of the next-closest sample does not match the attribute of the centroid, the most-recently located matching sample is located outside the radius; and the determination module adjusts the radius by increasing the radius.

13. A non-transitory computer-readable medium comprising one or more computer-executable instructions that, when executed by at least one processor of a computing device, cause the computing device to:
- identify a plurality of samples that have been grouped into existing clusters, the existing clusters comprising a predetermined cluster radius;
- locate a sample, from within the plurality of samples, that is a centroid of an existing cluster;
- restructure the existing cluster to generate a new cluster that includes samples with matching attributes by:
  - locating another sample that is, among the plurality of samples, next closest to the centroid relative to a most recently located sample;
  - determining whether an attribute of the next-closest sample matches an attribute of the centroid;
  - determining whether to adjust the radius of the existing cluster based on whether the attribute of the next-closest sample matches the attribute of the centroid;
  - repeating the steps of locating the next-closest sample, determining whether the attributes match, and determining whether to adjust the radius of the existing cluster until the attribute of the next-closest sample does not match the attribute of the centroid, and when the attribute of the next-closest sample does not match the attribute of the centroid, adjusting the radius of the existing cluster by setting the radius as a distance from the centroid to a most-recently located matching sample such that only samples with matching attributes are included within the new cluster; and
- restructure the existing clusters that have not been restructured by generating, using samples within the plurality of samples that are not included in the new cluster, additional new clusters until each sample within the plurality of samples is included within at least one new cluster, wherein for each additional new cluster:
  - the additional new cluster comprises a variable cluster radius instead of the predetermined cluster radius;
  - the additional new cluster includes at least one sample whose attribute matches an attribute of a centroid of the additional new cluster; and
  - the additional new clusters are generated by a computing system such that a single pass over the plurality of samples is needed to assign each sample to a new cluster without requiring additional computing resources that would be needed from the computing system for multiple iterations of a clustering algorithm.

14. The non-transitory computer-readable medium of claim 13, wherein the computer-executable instructions further cause the computing device to:
- determine whether the attribute of the next-closest sample matches the attribute of the centroid by determining that the attribute of the next-closest sample matches the attribute of the centroid; and
- determine whether to adjust the radius of the existing cluster by determining to not adjust the radius.

15. The method of claim 1, wherein generating the additional new clusters further comprises, for each additional new cluster, selecting a sample from within the plurality of samples that is not already included within a new cluster to be the centroid of the additional new cluster.

16. The method of claim 1, wherein generating the additional new clusters until each sample within the plurality of samples is included within at least one new cluster is performed such that only a single pass over the plurality of samples is needed to assign each sample to a new cluster.

* * * * *